US009471681B1

(12) United States Patent
Amacker

(10) Patent No.: US 9,471,681 B1
(45) Date of Patent: Oct. 18, 2016

(54) TECHNIQUES FOR SEARCH OPTIMIZATION

(75) Inventor: Matthew W. Amacker, Santa Clara, CA (US)

(73) Assignee: A9.Com, Inc., Palo Alto, CA (US)

( * ) Notice: Subject to any disclaimer, the term of this patent is extended or adjusted under 35 U.S.C. 154(b) by 160 days.

(21) Appl. No.: 12/985,985

(22) Filed: Jan. 6, 2011

(51) Int. Cl.
*G06F 7/00* (2006.01)
*G06F 17/30* (2006.01)
*G06F 13/14* (2006.01)

(52) U.S. Cl.
CPC ............................. *G06F 17/30864* (2013.01)

(58) Field of Classification Search
CPC .................. G06F 17/30864; G06F 17/30867; G06F 17/3089; G06F 17/30424; G06F 17/30; G06F 17/30442; G06F 17/30648; G06F 17/30964; G06F 17/30899
USPC ........... 707/1, 730, 732, 736, 769, 781, 776, 707/713, 721, 748, 706–709, 722–723, 767, 707/733, 999.003, 751, E17.017, E17.107, 707/771, E17.014, 999.005, 784, E17.116; 705/14.64, 14.65, 26.1, 14.66, 26.7; 715/733, 854; 709/217
See application file for complete search history.

(56) References Cited

U.S. PATENT DOCUMENTS

| | | | |
|---|---|---|---|
| 7,921,092 B2 * | 4/2011 | Anick | G06F 17/30696 707/705 |
| 8,032,425 B2 * | 10/2011 | Yi | G06Q 30/02 705/26.64 |
| 8,229,925 B2 * | 7/2012 | Haugen | G06Q 30/02 705/14.54 |
| 8,271,878 B2 * | 9/2012 | Kane | G06Q 30/02 715/733 |
| 2006/0026013 A1 * | 2/2006 | Kraft | G06Q 10/10 705/1.1 |
| 2009/0234711 A1 * | 9/2009 | Ramer | G06F 17/30749 705/14.66 |
| 2010/0306224 A1 * | 12/2010 | Ciemiewicz | G06F 17/30864 707/759 |

* cited by examiner

*Primary Examiner* — Usmaan Saeed
*Assistant Examiner* — Cecile Vo
(74) *Attorney, Agent, or Firm* — Hogan Lovells US LLP

(57) ABSTRACT

Techniques for optimizing a search are disclosed. In one embodiment, a method for optimizing search on a Web site comprises: receiving from a client computing device a first search request including a first search term, retrieving and rendering to the client computing device first search results including one or more items corresponding to the first search term included in the first search request, receiving from the client computing device a second search request associated with an item of the one or more items rendered with the first search results, retrieving one or more second search terms behaviorally associated with the selected item, and retrieving and rendering to the client computing device second search results corresponding to the one or more second search terms. The second search results may be rendered "in-line."

18 Claims, 8 Drawing Sheets

TECHNIQUES FOR SEARCH OPTIMIZATION

BACKGROUND

Electronic entities having a presence in an electronic environment, such as may be provided via a Web site or other such source of content, take advantage of the full capabilities of modern Web-based services to deliver a compelling user experience. For example, items offered for sale on a Web site may be divided by categories, prices, types, and other identifiers. A user may search for item(s) of interest using a search service associated with the Web site. Search results for an item may include a list of items including, for each item, price, description, images, availability and other types of data associated with the item. Once initial search results are received, a user may make further search refinements by searching for an item within a particular category (e.g., searching for a TV set under "Electronics" category), using particular search criteria (e.g., price range), further defining search terms (e.g., defining an original search term "TV" as an "LCD TV") or otherwise refining his or her search.

However, further refinement of the original search still may not bring the desired results or get a user closer to his or her search target. For example, additional search terms or phrases may be attempted by a user which may not locate or surface an item the user is seeking. Accordingly, additional time, effort, and resources are spent for any additional search for the item requested by a user.

DETAILED DESCRIPTION

Figure 1:
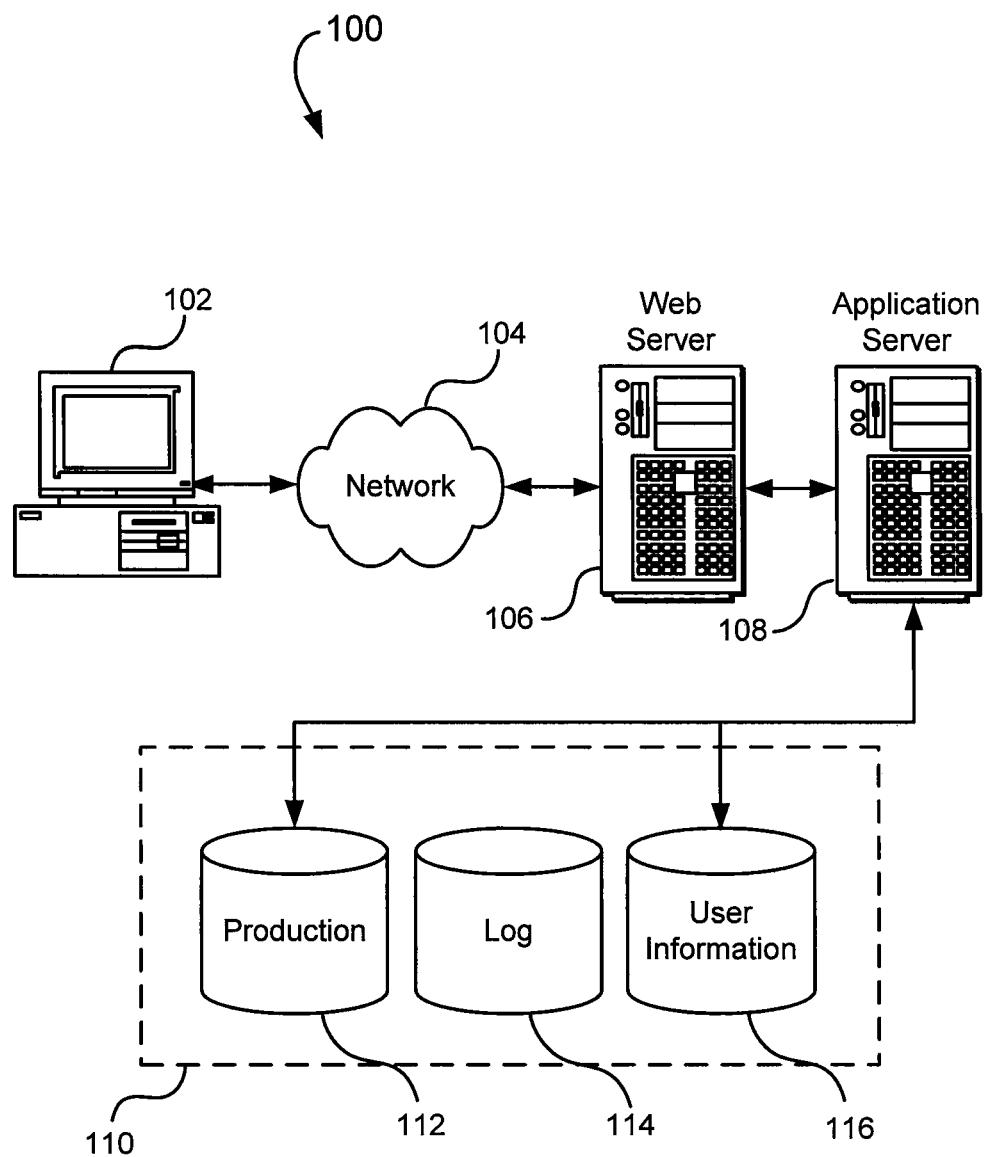
FIG. 1 illustrates an environment in which various embodiments can be implemented.

Techniques are presented for conducting search processes, such as search requests submitted to at least one data source, in accordance with various embodiments. In a Web-based environment, for example, a data source may include a Web resource, such as a Web site that is suitable for the World Wide Web and can be accessed through a Web browser and displayed on a display element of a computing device, where at least some content for the Web site is pulled from at least one data store against which the search request can be executed. A user may conduct a search for any item of interest (e.g., a product, video or audio content, image, and the like) on the Web resource using Web-based search services, such as, for example, search engines. One skilled in the art will appreciate that a variety of Web search services is available to a user nowadays. In one embodiment, Web resources (such as Web pages) visited by a user may contain information for one or more items (e.g., products or services) that the user located, such as through browsing or search.

Ordinarily, users of a Web resource, e.g., an electronic repository, whether in the context of an electronic commerce system, a general purpose search engine, or other system, use search terms or search phrases in order to locate or "surface" an item in the electronic repository. As should be understood, a combination of search terms may comprise a query and may contain one or more keywords needed for search of an item. However, search terms submitted by a user to a search engine, electronic commerce application or other system may fail to locate items that the user seeks in an electronic repository. As a non-limiting example, a user may submit one or more search terms in an attempt to locate an item in an electronic commerce system. However, the electronic commerce system may be unable to locate the item desired by the user via an initial search based upon the search terms (e.g., a search that employs word matching of the search terms and text located in data fields associated with the item). As a result, the electronic commerce system may fail to display the desired item to the user. Such a failure can manifest itself if the submitted search terms do not appear in item data that is associated with the item in the electronic repository.

In a similar scenario, because search engines often rank search results that are returned to a user, search terms (queries) submitted by a user may result in a ranked list of search results that has not appropriately ranked items according to the expectation of the user. As one non-limiting example, upon submission of search terms intended to locate one or more items in an electronic repository, the search results may display the item sought by a user below or outside the initial search results, which may cause a less than optimal user experience. Accordingly, the user is forced to refine his or her search by one of the methods described above, e.g., by defining a particular search category, using particular search criteria, further defining search terms or otherwise refining his or her search. However, even this (often times repeated) refinement of search is not a guarantee of successful "surfacing" of a desired item.

In one embodiment, techniques described herein utilize behavioral associations of unique item identifiers of items and search terms associated with searched items as described below. An electronic entity associated with a search engine may track a user search session in order to identify search terms or search phrases that can be associated with one or more items in the electronic repository. Therefore, it is possible to identify search terms (e.g., a query including one or more search terms) submitted by a user and determine whether the terms could be associated with an item in the electronic commerce system by detecting whether a search engine or search application "surfaces" a particular item that the user eventually purchases within the same session. In other words, queries comprised of search terms can be behaviorally associated with items in the electronic repository if the behavior of a user while interacting with a system (e.g., a search engine, electronic commerce system, etc.) illustrates an association between user-submitted search terms and an item.

In one embodiment, an electronic entity associated with a Web page may supply a unique identifier (item identifier)

that is associated with each item. A unique identifier, in one example, refers to a unique identification number or other alphanumeric string assigned to a product for identification purposes. The unique identifiers may be internal or specific to the electronic entity. Alternatively, unique identifiers of products may be supplied by vendors associated with the electronic entity, and may be the same for different electronic entities. A main characteristic of a unique identifier is that the identifier can be recognized by an electronic entity. In one embodiment, item identifiers of items may be utilized for associating with search terms used to locate the items during a search.

In one example, embodiments of the disclosure can determine whether search terms are behaviorally associated with an item in an electronic repository by tracking user behavior within a user session. In the above example, user-submitted search terms can be behaviorally associated with an item that the user eventually purchases within a session. Such a behavioral association can be detected even if a search of the electronic repository using the user-submitted search terms does not directly surface the item that the user eventually purchases. Alternatively, user-submitted search terms (queries) can be behaviorally associated with the item in cases, for example, of a user viewing an item, adding an item to a shopping cart, or other user behavior.

If queries containing one or more search terms submitted by a user are behaviorally associated with an item in the electronic repository, embodiments described herein can calculate a weight value representing a degree of association between the search query and an item in the electronic repository. Weight values according to embodiments of the disclosure can be calculated on an aggregate basis, taking into account user sessions of multiple users of a system. An association between an item and a search term (or a query including one or more search terms) can get stronger when it is determined from tracking user search behavior that an item in association with the query has appeared with a determined frequency. Simply speaking, an association between the query "egg toaster" and a particular product (e.g., an egg toaster) is stronger than an association between the query "egg and muffin maker" and the egg toaster if the association "egg-toaster (query)-egg toaster (item)" is detected more times than the association "egg and muffin maker (query)-egg toaster (item)," in at least some embodiments. Accordingly, weight values calculated on an aggregate basis can yield more accurate associations between search queries and items in an electronic repository, as such calculations take into account the behaviors of a larger number of users.

If a calculated weight value representing a degree (level) of association between at least one search query and an item in an electronic repository exceeds a threshold, the user-submitted search queries can be identified by embodiments of the disclosure as potentially missing search terms (keywords) for the item for which a behavioral association exists. In other words, if a user-submitted search query fails to directly surface an item or fails to highly rank an item consistent with the expectations of a user, the search query can be identified as potentially missing keywords for the item. A threshold can be chosen to tune the sensitivity of the detection of potential missing keywords. Alternatively, the threshold can be lowered to a lower calculated weight value (e.g., representing a lesser degree of association) so that more potential missing keywords are identified. Behavioral association techniques are disclosed in U.S. patent application Ser. No. 12/560,983 entitled "Identifying Missing Search Phrases," filed Sep. 16, 2009, which is incorporated herein by reference in its entirety.

Behavioral associations between searchable items and search queries may be accumulated and stored in a behavior-based keyword data store (behavioral association data store) and utilized for the purposes of search optimization techniques described herein. In one embodiment, a user conducting an initial search for an item may submit one or more search terms comprising a query to a search engine. The search engine returns search results of items associated with the submitted search term (or terms). The initial search results may include item information associated with each item, including, for example, images of items and/or item descriptions. Also, each item returned with the search results may have one or more search queries behaviorally associated with the item (in one embodiment, with the item's unique identifier).

The search queries may be generated and stored in a behavioral association data store as discussed above and retrieved from the data store as needed. Thus, each search query may be associated with an item of the search results via a behavioral association described above. Some queries may have a stronger association with an item than others, as discussed above. In one embodiment, only a determined number of search queries with the strongest association with the item (e.g., one search query) may be retrieved from the behavioral association data store and returned with the item. For example, in one embodiment, only the search query that has the strongest association with the item may be retrieved.

In one embodiment, the search queries behaviorally associated with the item may be retrieved from the behavioral association data store upon a user request. For example, information for each item returned with the list of initial (first) search results may include a content element of any type known in the art that, when accessed, may initiate a request for a retrieval of queries behaviorally associated with the item's unique identifier. The content element may include, but may not be limited to, a hyperlink, a button, an icon, an image, or any other type of content element accessible (e.g., clickable) by a user. In one embodiment, a content element may have a descriptor included in the element to help a user identify the functionality the content element represents. For example, the content element may be implemented as a hyperlink, icon, image, or button with a descriptor "more" or "more like this."

In one embodiment, the user may view (e.g., by scrolling down) the first search results list and identify an item in the search results that might be "closer" to the desired item, but still not quite the one that the user had in mind when commencing the search. In other words, the item may comply with, or represent, at least one aspect of a user's intent in conducting the search. This determination may be made based on the information associated with the item returned in the search results. For example, a user may view the item's description and decide to continue a search in the direction identified by the description (e.g., a user was looking for a TV set and the first search results returned one LCD TV that the user liked and so the user wanted to search more of the LCD TVs). In another example, a user may simply like the look of an image of the item (e.g., a user was looking for sunglasses and liked sunglasses of a particular shape). The user then may want to access the content element "more like this" associated with the item the user liked the best among the returned results. For the purposes of simplicity, the item that user liked the best among the returned results, i.e., the item in the search results that is most representative of the user's intent, will be hereinafter called a "similar item."

When the user clicks on the content element with the descriptor "more like this" that is associated with the similar item, a request to retrieve search queries behaviorally associated with the similar item is initiated, the search queries are retrieved from the behavioral association data store and sent to the search engine to conduct a search associated with the retrieved search terms. As described above, in one embodiment, only "most popular" search queries, namely the queries with the strongest association with the similar item, may be retrieved and used in a new search. For example, a predetermined number (e.g. one, two, or three) search queries that have the strongest association with the similar item may be retrieved for a further search.

A list of new, second search results is then returned to the user. As in the first search results list, the second list rendered to the user may include "more of this" content elements associated with each returned item. Thus, the user, if not yet satisfied with the search, may repeat the above steps again and conduct another search of items that are "more like" the item selected by the user as a new similar item. In one embodiment, the second search results may be rendered to a user "in-line," i.e., without a page reload, via a trusted script embedded in the page, e.g., Ajax® script. In another embodiment, the second search results may be included in a page in a separate space (e.g., a "band") specially allocated for the search results associated with the "more like this" functionality.

In one embodiment, only the search query that has a highest level of behavioral association with the similar item may be used for further (second) search. One skilled in the art will appreciate that there may be different selection algorithms aimed at selecting the query with the highest level of behavioral association with the item among all search terms behaviorally associated with that item. For example, as discussed above, an association between an item and a search query gets stronger when a substantial statistic is gathered in which an item in association with the query has appeared with a frequency exceeding a predetermined threshold.

In another example, as should be appreciated by one skilled in the art, the most "specific" behaviorally associated search queries have to be the most tightly (strongly) associated with the item, and, consequently, have a higher level of behavioral association with the item relative to that of the less "specific" queries. The behavioral association of items to search queries may be explained in the context of "specificity" of a search query. A behaviorally associated search query will, in general, be more "specific" than an original search query or the queries that brought in the last content item (e.g., a Web page) viewed by a user. A "more specific" query may mean that the query contains an extra word or words further defining the original query. In another embodiment, the "more specific" query may be a query that brought in a number of results that is less than the number any other related query would bring. For example, a search for Bob Dylan sunglasses using a query "Bob Dylan apparel" may bring many more results than a search for "Bob Dylan sunglasses." Accordingly, "Bob Dylan sunglasses" is a more specific query than "Bob Dylan apparel" and has a tighter (stronger) association with Bob Dylan sunglasses than the query "Bob Dylan apparel."

In another embodiment, a more specific query may be selected based on its entropy metrics, e.g., a growing popularity of the query. For example, if a particular query has been increasingly used in connection with a particular item in a determined period of time, it becomes apparent that the query's "popularity" in connection with the item is growing and the query may be more specific than others in identifying the particular item.

In yet another embodiment, a degree (level) of behavioral association of a query to an item may be determined based on a number of different metrics; for example, how many items have come up in search results based on the associated search query, how many users "clicked" on the item found through the associated search query, how many times the item associated with the search query have been "added to cart," or purchased, and the like. One skilled in the art will appreciate that there may be a number of different algorithms for determining a level of behavioral association of an item to a particular search query. The metrics defining the "specificity" or a level of behavioral association of a search query to an item may be pre-computed and stored along with the search queries in the behavioral association data store.

In one embodiment, a degree (level) of behavioral association of a query to an item may be determined based on a direction of the search. For example, it may be determined from recorded search history that a particular query, when used in a search, may be different from one or more search queries used by the user in the previous search rounds, such that the user would have an entirely new direction of further search.

In another example, a "market" analysis of a search query may be done that would determine whether a query contains a "cluster" of keywords that, taken together, define a brand, a line of product, or any type of a known entity. For example, a search query containing the keywords "red," "socks," and "shirt" may be considered as including an entity "red socks" ("red sox"). This query may have a precedence over other search queries behaviorally associated with a particular similar item because a user is likely to be searching for an item or items associated with the brand "red sox" rather than using a query including the words "red," "socks," and "shirt" with no meaningful association between these words.

The described techniques have a number of advantages over conventional, repeatedly refined searches. First, a user clearly identifies a direction of further search by selecting a similar item in the initial search results. The user has at least some concept of a desired object in his/her mind when he/she conducts initial search. Thus, "sending" the search in a desired direction by using search queries associated with the similar item, in effect, substantially narrows down further search by effectively "validating" further search.

In contrast, conventional search systems may utilize product-query (or product-search term) associations, but in a different, less productive way, for example, on a "product by product" basis. As anyone who has done Web searches knows, a first, initial search typically brings a number of random results that may or may not present a user with a sufficient number of good options. By way of example, a user may click on one item brought in search results (e.g., LCD TV) and later click on another item (e.g., red shirts). However, a conventional system would associate an LCD TV with a red shirt for future reference, such as, for example, for a recommendation "a user who viewed this item also viewed that item." Understandably, the data assembled by conventional search systems as described above is fairly "noisy" and the "noise" (incorrect item associations) disappears only when a substantial volume of data has been gathered and processed by the system.

Second, further search is based on behavior-based associations between the new search queries and the similar item that have already been tested numerous times by a plethora of users and therefore are likely to bring the user much closer to the desirable item than a regular "refined query" search, for example. This is the case because, in effect, the second search involves search queries that have historically been most used to find the similar item and therefore these queries are most likely to bring the desired item to the user.

Third, a user does not have to enter a new, refined search query or even think about how to refine the original query. Indeed, all the user has to do is to visually identify an item among initial search results that, in the user's view, is the closest to a desired item, and click on the "more like this" content element associated with the identified item. In one embodiment, the second search may render, along with the second search results, the most popular search query associated with the similar item and used by the system in the second search.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
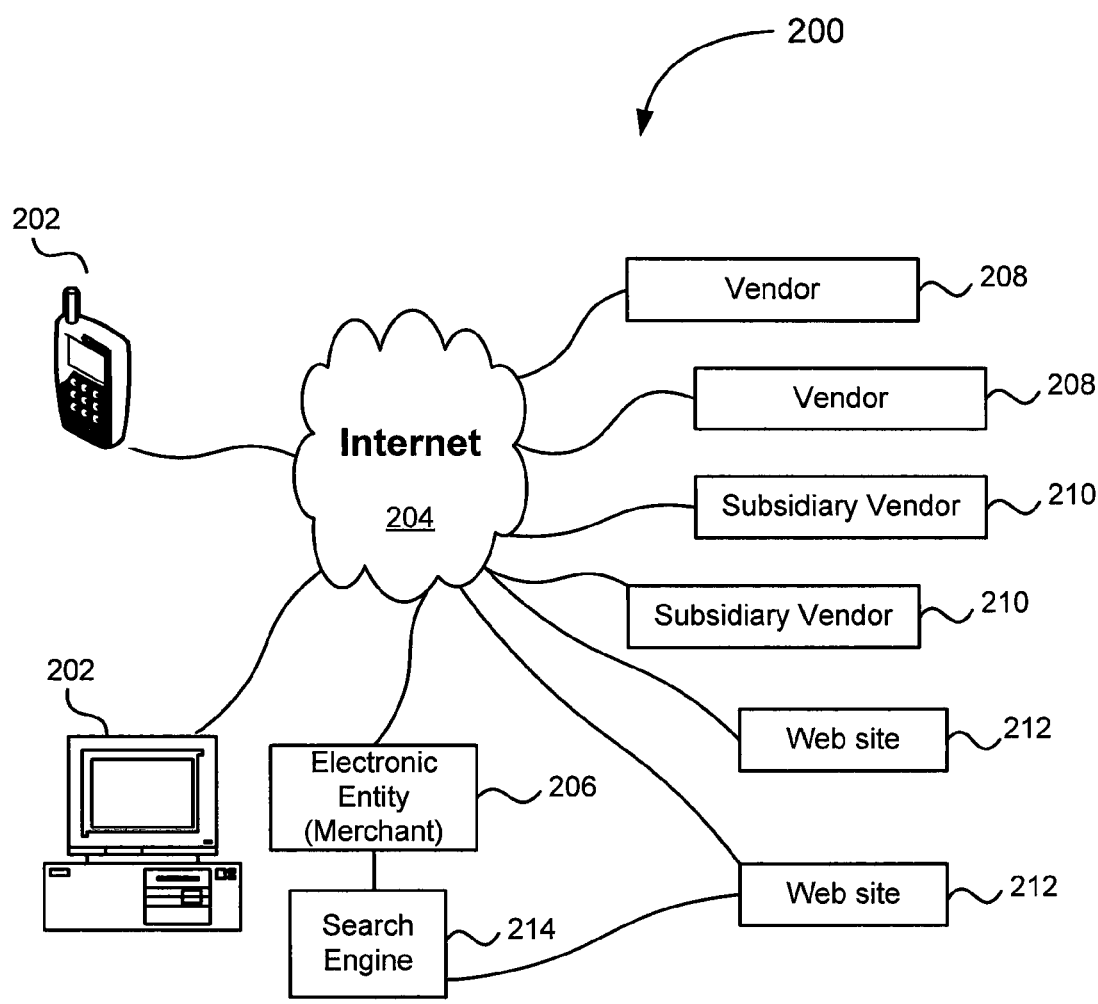
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users operating client computing devices 202 that utilize a network such as the Internet 204 to browse content of various content providers. While the environment 200 shows the client computing devices 202 utilizing the Internet, it should be understood that other networks may be used as an alternative to or in addition to the Internet 204. Examples of other networks include mobile networks, intranets, and generally any suitable communications network.

Likewise, it should be understood that client computing devices 202 may include personal computers, cell phones, handheld messaging devices, laptop computers, set-top boxes, personal data assistants, electronic book readers, and the like.

In an embodiment, users may interact through devices 202 with other entities in order to consume content, search for information or items for consumption, purchase items for consumption, and the like. As used herein, an item for consumption includes any product or item which may be consumed by a consumer. Examples include tangible items, such as consumer products. Examples also include electronic items which may be downloaded and/or streamed, including audio files, video files, and other digital content. Examples of items for consumption also include services which may be performed for and/or on behalf of consumers. As shown in FIG. 2, the environment 200 includes an electronic entity, or merchant 206. The merchant 206, for example, may operate an electronic marketplace such that the users may search, via devices 202 utilizing search services (e.g., a Web search engine 214), for items for consumption offered by the merchant 206. The merchant 206 may offer items for consumption that come from various sources, including the merchant's own sources. For example, the merchant 206 may operate systems, such as those described above in connection with FIG. 1, that enable others to utilize the systems to offer items for consumption. In short, the merchant 206 may facilitate user search and consumption of items or products offered by the merchant 206 and/or vendors 208 and/or 210.

For example, in an embodiment, the environment 200 includes one or more affiliate or third-party vendors 208. In an embodiment, an affiliate vendor is a merchant who offers for consumption items that are actually consumed by consumers from the merchant 206. Affiliate vendors 208 may cooperate with the merchant 206 in various ways. In one embodiment, the merchant 206 may operate an electronic marketplace, such as a Web site 212 and advertise and/or sell items for consumption that are offered by the affiliate vendor 208. Affiliate vendors 208 may utilize various systems provided by the merchant 206, such as electronic search services that enable users to search for items for consumption, and other systems.

The environment 200 may include one or more subsidiary vendors 210. In an embodiment, a subsidiary vendor is a merchant whose operations may be controlled, either completely or partially, by the merchant 206. For example, a subsidiary vendor 210 may be operated by the merchant 206, but may offer items for consumption under a different brand than the merchant 206. The subsidiary vendor 210 may offer the same or different products for consumption than the merchant 206. Alternatively, the subsidiary vendor 210 may be operated by the affiliate vendor 208, but may offer items for consumption under a different brand than the affiliate vendor 208, which may be advertised and/or offered for sale by the affiliate vendor 208 on the merchant 206's Web site 212.

In an embodiment, the environment 200 includes components and instructions for generating one or more Web sites 212. One or more of the Web sites 212 may be operated by the merchant 206, although they need not be. The Web sites 212 may offer various types of content, such as news, video, shopping for products, and the like. The Web sites 212 may offer other services, such as content or product search services, audio, social networking services, and the like. While the example environment 200 shows Web sites for the purpose of illustration, it should be understood that any type of content provider may be included in the environment 200 or variations thereof. For example, content may be provided in various ways, such as through an application interface or through other mechanisms that may not be properly classified as Web sites.

As noted, in an embodiment, the users may interact with content from the various entities, such as by searching products offered by the entities, viewing content from the entities, consuming items from the entities, and the like. In order to search for products or other content provided by the entities, the users may utilize a search service, e.g., the Web search engine 214. As one skilled in the art will appreciate, a Web search engine may be a software or a combination of software and hardware designed to search for information on the Internet. The search engine may be rendered to a client device 202 via a particular Web site or Web sites, such as the Web sites 212. The Web search engine 214 may be affiliated with the merchant 206 in a number of different ways, such as, for example, it may be designed and/or owned by the merchant 206, operated by the merchant 206, contracted by the merchant 206, be independent or autonomous from the merchant 206, and the like.

Figure 3:
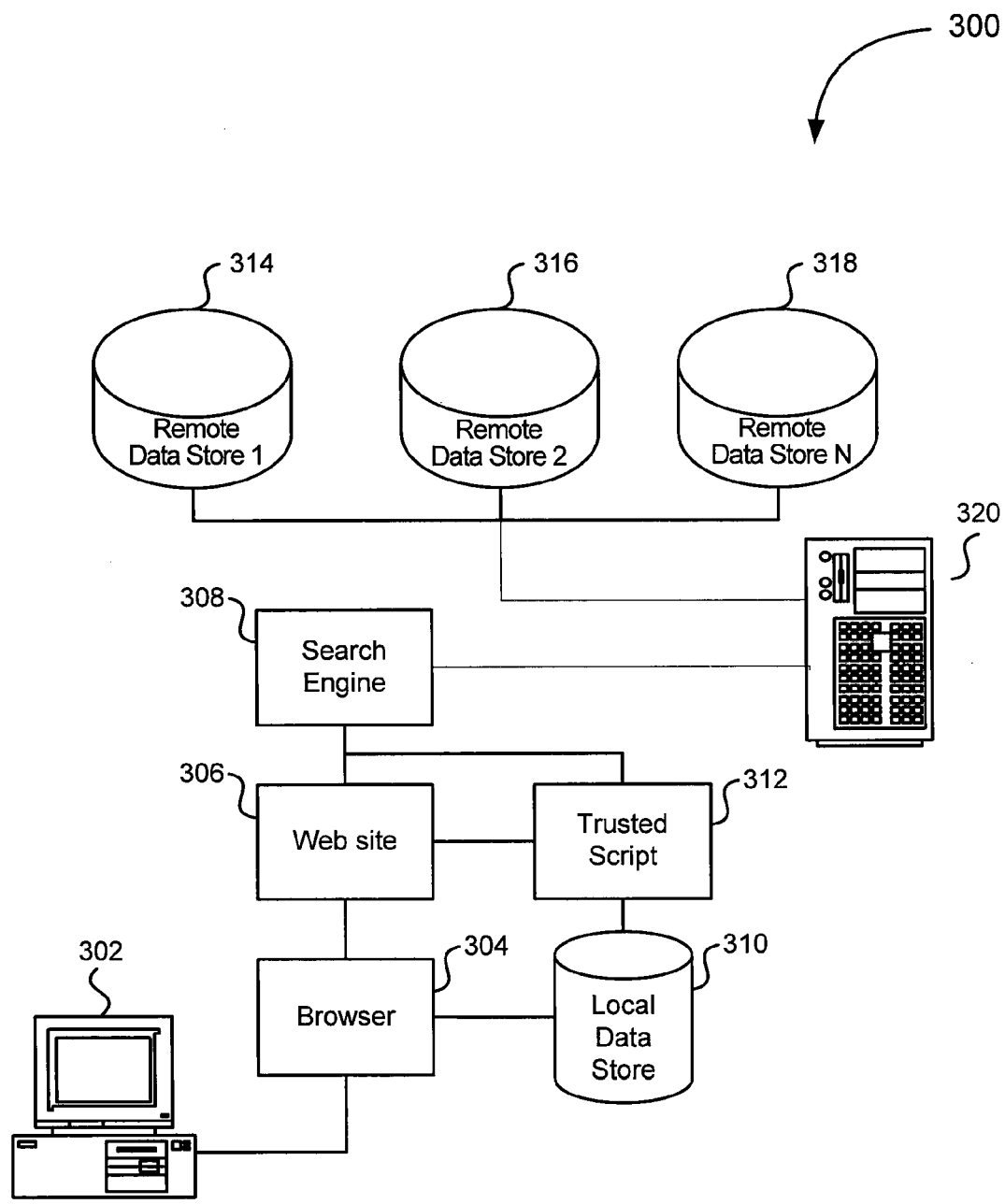
FIG. 3 illustrates a diagrammatic representation of an environment which may incorporate one or more components that are described above in connection with FIGS. 1 and 2 and that may be used in accordance with various embodiments.

FIG. 3 shows an illustrative environment 300 that an electronic entity such as the merchant 206 may utilize in order to provide a user with an ability to repeatedly search for product items or other content offered by the merchant 206 and/or vendors 208 and 210 in accordance with an embodiment. The environment 300 may be implemented to increase search efficiency for the users utilizing one or more client devices 202 and thus increase effectiveness for one or more of the entities 206, 208, and/or 210 shown in FIG. 2. In an embodiment, the environment 300 of FIG. 3 is utilized by an electronic entity (such as the merchant 206 shown in FIG. 2) to provide an improved search experience to a user using a search service described herein. It is to be understood that the search service may comprise a number of various implementations, including, but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

In an embodiment, the environment 300 includes a client computing device 302 utilized by a user for interaction with electronic entities that provide content. Content may be accessed by a user operating the device 302 through a browser 304. For example, content may include products or items of various types that are to be placed on a Web site 306. The Web site 306 may utilize a search engine 308 in order to provide a user with the ability to search for products offered by the merchant 206 or other entities. The content may be stored in the remote content data store(s) 314, 316, and 318 and may be utilized by merchants, Web sites, or other entities in order to provide users an opportunity to search for, and view, items for consumption and/or other content. In an embodiment, the content data stores 314-318 store content to be provided to users, such as when users request the content by navigating to a Web site 306 operated by a merchant (e.g., merchant 206 on FIG. 2) through a Web server 320. In one embodiment, one or more of the data stores 314-318 may be allocated as a behavioral association data store to store information related to behavioral associations between items (or item unique identifiers) and search queries. Alternatively, information related to behavioral associations may be stored in a local data store 310.

The local data store 310 may be implemented in a number of different ways. For example, in an embodiment, the data store 310 may comprise a dedicated database accessible by the trusted script 312. In some Web environments, such as, for example, one provided by the HyperText Markup Language (HTML) 5, the local data store 310 may be allocated within a Web site or within a domain. For example, the local data store 310 may be embedded in the pages of the Web site 306 and may be shared with any page visited by the user on that Web site.

It will be appreciated that the content may be stored in one or more data stores and that three data stores 314, 316, and 318 are shown for purely illustrative purposes, such that the number of data stores is not limited to three or any other number. The term "remote" used in conjunction with the term "data store" simply means that the data stores 314, 316, or 318 are not placed in an application operating on the computing device 302 or in the computing device itself. The remote data stores may be accessible with the search engine 308 through the Internet or any other type of computer network known in the art. The remote data stores may be associated with the electronic entity, such as above-noted merchant 206. For example, the remote data stores may be associated with the server 320 serving the Web site 306 operated by the merchant 206.

In an embodiment, a trusted script 312, implemented in one embodiment as an Ajax® script and operating on the Web site 306 that is loaded by the browser 304, is configured to provide search results for the second search "in-line," i.e., without reloading the results page. In some embodiments, the trusted script may also be implemented as an ActionScript®, JavaScript®, VBScript®, Java Servelet®, Flash®, JScript® or other scripting languages. The trusted script 312 may be loaded on a page of the Web site 304 when a user accesses the Web site. In another embodiment, the trusted script may be implemented as an extension (i.e., a plug-in application) to the browser.

In operation, Web site 306 is displayed on computing device 302 via the browser 304. A user may conduct a search using search engine 308 in order to search items in one or more data stores 314-318. When a user sends a first search request for an item via the search engine 308, the data corresponding to the user's request is assembled and returned to the user via the Web site 306 served by the server 320 and rendered by browser 304 on computing device 302. The returned data may also be stored in the local data store 310. As described above, the returned data may include item identifiers of returned items. When the user selects a similar item and submits a second, "refined" search request "more like this" via the search engine 308, the server 320 will retrieve corresponding behavioral associations between the item identifier and search queries from the behavioral association data store, determine the search query with the strongest association with the item (in one embodiment, this determination may have been made in advance and relevant information stored with the search queries), and conduct a second search using the search query with the strongest association. As described above, in one embodiment, a predefined number of search queries with the strongest association with the item may be used. The returned data is subsequently rendered for display to the user's computing device 302 via the Web site 306. The returned results may be displayed "in-line," without a page reload, via the trusted script 312.

Figure 4:
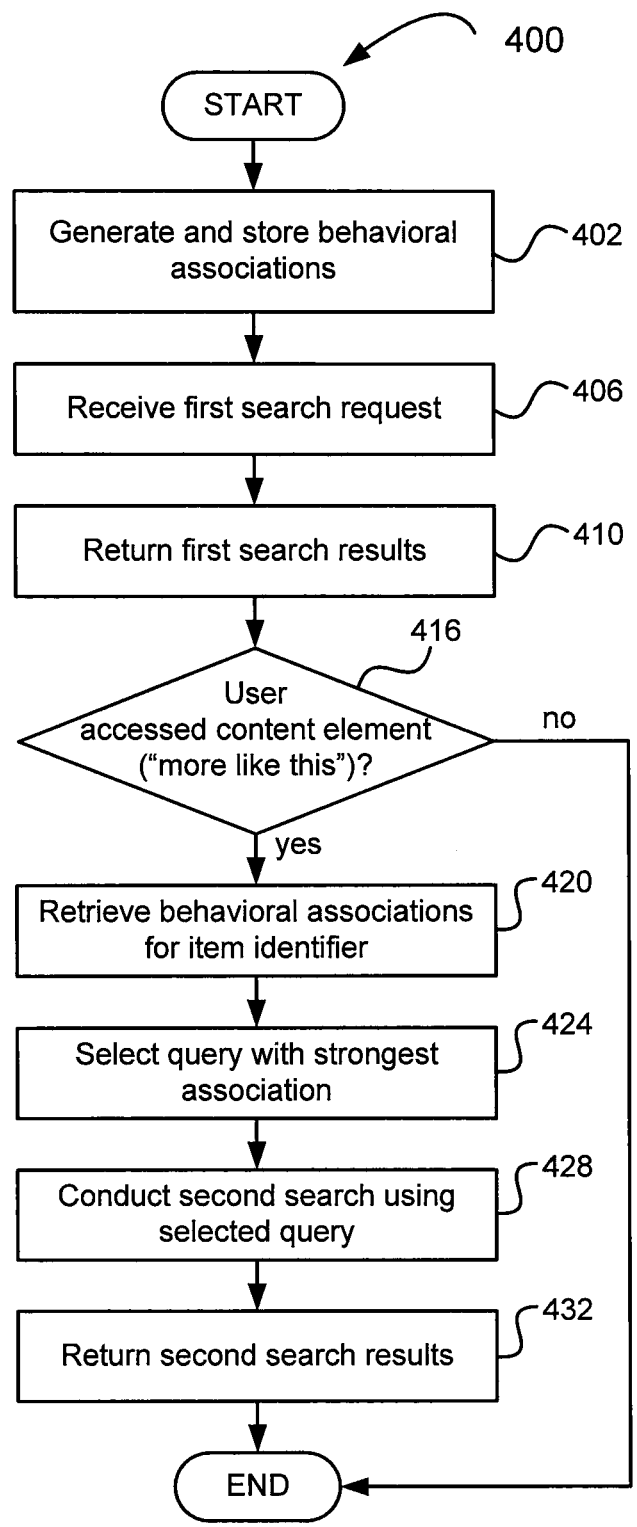
FIG. 4 illustrates a process flow diagram for operation of the search service in accordance with an embodiment.

FIG. 4 illustrates a process flow diagram for the operation of the search service described herein in accordance with an embodiment. The process 400 starts at block 402 where behavioral associations of each searchable item and search queries are generated. As described above, the search queries may be selected based on recorded user behavior during search for items. The search queries may be associated with an item identifier of each item. In one embodiment, the search queries behaviorally associated with each item are stored in a behavioral association data store accessible by a Web server providing the search service.

At block 406 the first search request is received. The request may contain a search query comprising one or more keywords. At block 410, the first search results associated with the request are returned and rendered to the user's computing device. As described above, the returned results may contain items, item description, item identifiers, and/or other such information. The associated item information may include, but is not limited to, price, availability, shipping requirements, and so on. In one embodiment, the returned results may include a content element rendered with the item information for each item, e.g., an icon, a button, a hyperlink, or any other content element configured to be accessible by the user and, when accessed, to cause a retrieval of the search queries behaviorally associated with the item and stored in the behavioral association data store. As noted above, the content element may be marked with a descriptor "more," "more like this," or the like.

At determination block 416, it is determined whether a second search request is received. The second search request may be initiated by the user accessing a content element associated with the item that, in user's view, is a similar item, but not quite the one. If the request has been received, the process moves to block 420 where the behavioral associations of the item identifier of the similar item with the search queries are retrieved from the behavioral association data store. At block 424, the query with the strongest association with the item identifier is selected from the retrieved item identifiers. As described above, the determination regarding a level of association between an item and each search query may be pre-computed. Alternatively, this determination may be made each time the request for retrieval of behaviorally associated search queries is received. Various selection algorithms described above may be used for the level of association determination.

At block 428, a search for items associated with the search query selected in the previous step is conducted. The item information is retrieved from one or more data stores associated with the Web site in accordance with the request. Finally, at block 432, the second search results are rendered for display to the user and the process 400 ends. In one embodiment, the results retrieved at block 414 may be first rendered for display "in-line" using a trusted script embedded in a page of the Web site as described above. In this instance, the page does not have to be reloaded. The second search results may include the search query identified by the search system and used in the second search.

It is to be understood that a user may conduct any number of searches, such as more than two searches as described above. In this case, a subsequent search may utilize the search techniques described above: a user may again select a "more like this" content element associated with another similar item returned with the second search results as a result of the previous search and the process of selecting a search query with the strongest behavioral association with that item and subsequent search utilizing the selected query may occur.

Figure 5:
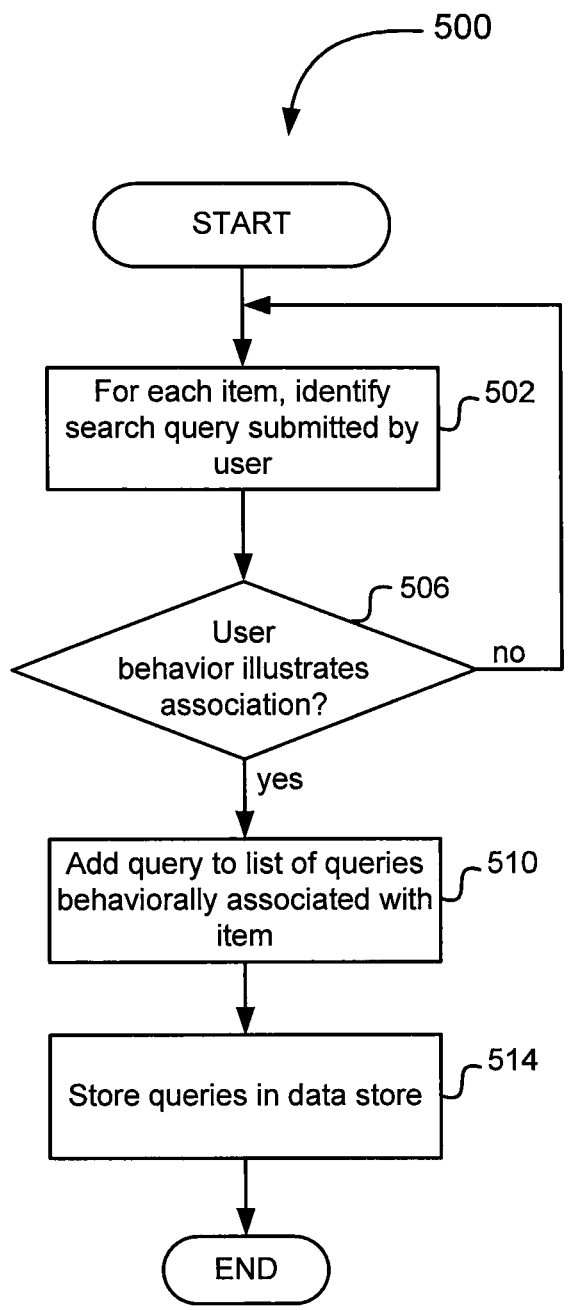
FIG. 5 illustrates a process flow diagram for operation of the search service in accordance with another embodiment.

FIG. 5 illustrates the process flow diagram for the operation of one aspect of the search service in accordance with an embodiment. Specifically, FIG. 5 illustrates a method for determination of search queries behaviorally associated with an item searchable on the Web site. The method involves assembling and recording information related to users' search for items on the Web site using various search queries. As discussed above, a search query may comprise one or more keywords to be input in a search engine, e.g., "Panasonic TV," "LCD TV," "TV set," "television set" and the like. At block 502, for all items, the search queries used by users in relation to a particular item are identified. For example, if the queries "Panasonic TV" and "LCD TV" were used to identify (e.g., by clicking, viewing, or purchasing) a particular television set (e.g., a Panasonic LCD TV of a particular model), the identified television set will be associated with the search queries "Panasonic TV" and "LCD TV."

At decision block 506, it is determined whether a user behavior demonstrates a behavioral association of an item and a search query. As noted above, a behavioral association can be detected by analyzing user session data of user sessions. Accordingly, if it is determined that one or more search queries are not behaviorally associated with an item, these search queries may be excluded from a behavioral association. For example, it may be determined that the search query "LCD TV" has a weak behavioral association with the Panasonic LCD TV of the particular model and thus should not be included in the list of search queries behaviorally associated with that TV set. This determination, i.e. a determination of a degree (level) of association may be implemented in a number of ways, as briefly described above.

For example, a weight value may be calculated based on user session data that reveals the activity of a user in relation to a search for the item. If a user purchases a product for which a behavioral association exists, this activity can be weighted heavily, as a purchase decision can be deemed to represent a high degree of behavioral association. Likewise, if a user views an item and adds the item to a shopping cart, but does not purchase the item, this activity can be weighted less than a purchase decision. Additionally, if a user simply views an item but fails to either add the item to a shopping cart or purchase the item, this activity can be weighted to an even lesser degree when calculating a weight value. Accordingly, at block 506 a determination is made as to whether a behavioral association between the query and item exists, and a level (degree) of the behavioral association may also be calculated. The level of association may be determined at different times. For example, as described above, the level of association may be calculated when a request for a search query with the strongest behavioral association is received from a user accessing the "more like this" content element associated with the similar item returned by the initial search as described above in reference to FIG. 4.

If it is determined that a search query belongs to a list of search queries behaviorally associated with a particular item, at block 510 the query is added to the list of behaviorally associated search queries. At block 514, the list may be stored in one or more behavioral association data stores. As noted above, the data store may be implemented as a "remote" or "local" data store depending on a particular implementation of the search service described herein. Thus, a database of search queries behaviorally associated with the items searchable on the Web site may be assembled and the process 514 ends.

Figure 6:
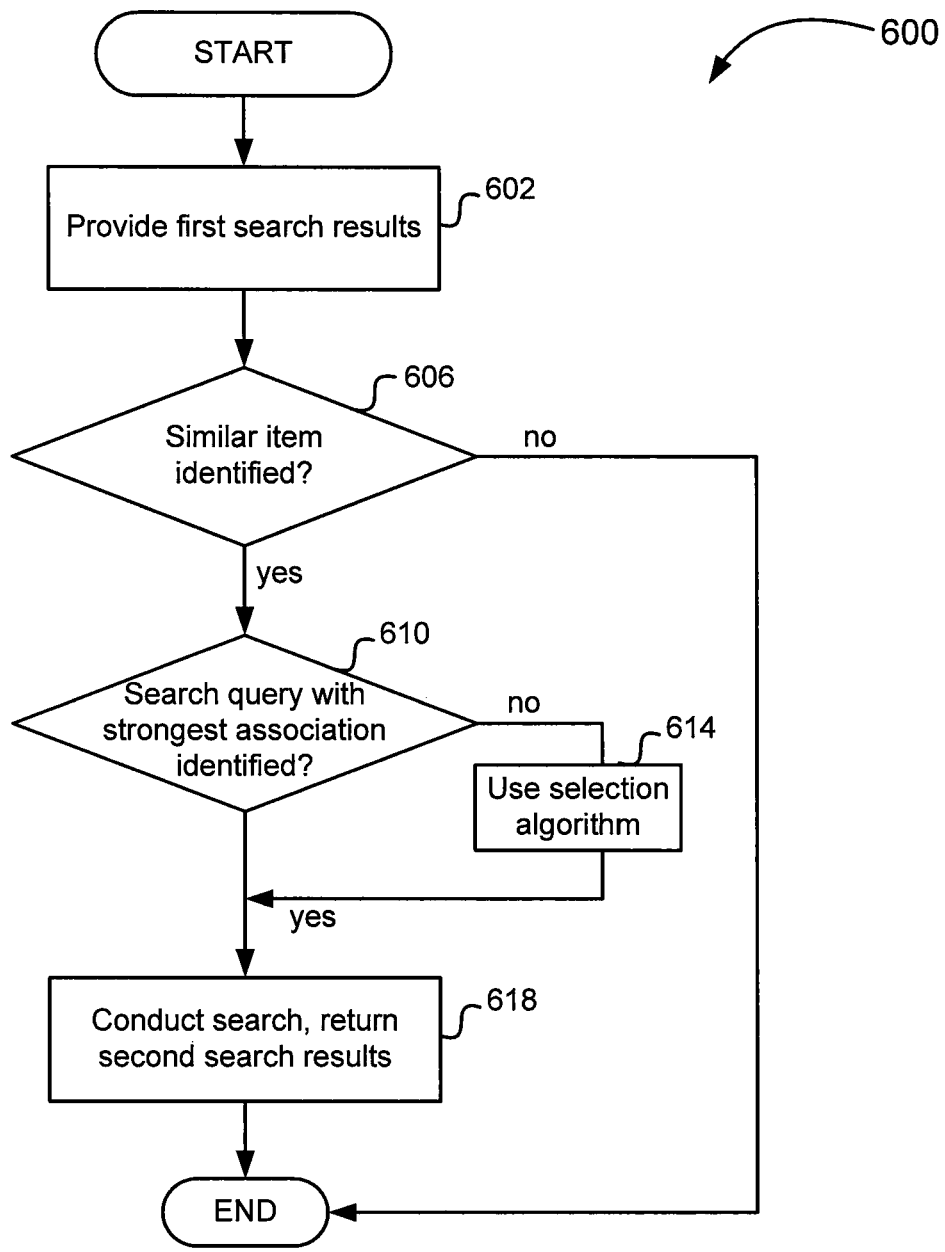
FIG. 6 illustrates a process flow diagram for operation of the search service in accordance with yet another embodiment.

FIG. 6 illustrates a process flow diagram for the operation of the search service in accordance with an embodiment. At block 602, the first search request (as described in reference to FIG. 4) is received, a corresponding search is executed, and first search results are provided and rendered for display. At decision block 606, it is determined whether an item that in user's view is similar to a desired item among the items returned with the first search results has been identified. If the similar item has been identified, at decision block 610 it is determined whether a search query with the strongest behavioral association with the similar item has been identified. If no such query has been identified, at block 614 a selection algorithm implemented as described above is applied in order to identify a search query with the strongest behavioral association with the similar item.

It should be noted that, in some embodiments, more than one search query with the strongest behavioral associations may be identified. For example, a number of search queries with the strongest behavioral association to be selected among the search queries may be predetermined (e.g., two, three, or four queries). In one embodiment, all search queries that have a behavioral association with the item may be selected to be used in further search. When the search query with the strongest behavioral association with the similar item has been identified, at block 618, a new search utilizing the selected query is conducted and the results are rendered to the user. In one embodiment, the selected query may also be rendered to the user so that the user can ascertain which query was selected to assist the user in his/her search. Subsequently, the user may refine his or her search by selecting another similar to a desired item rendered in the search results and receiving the new search results associated with the search query with the strongest behavioral association with the new similar item.

Figure 7:
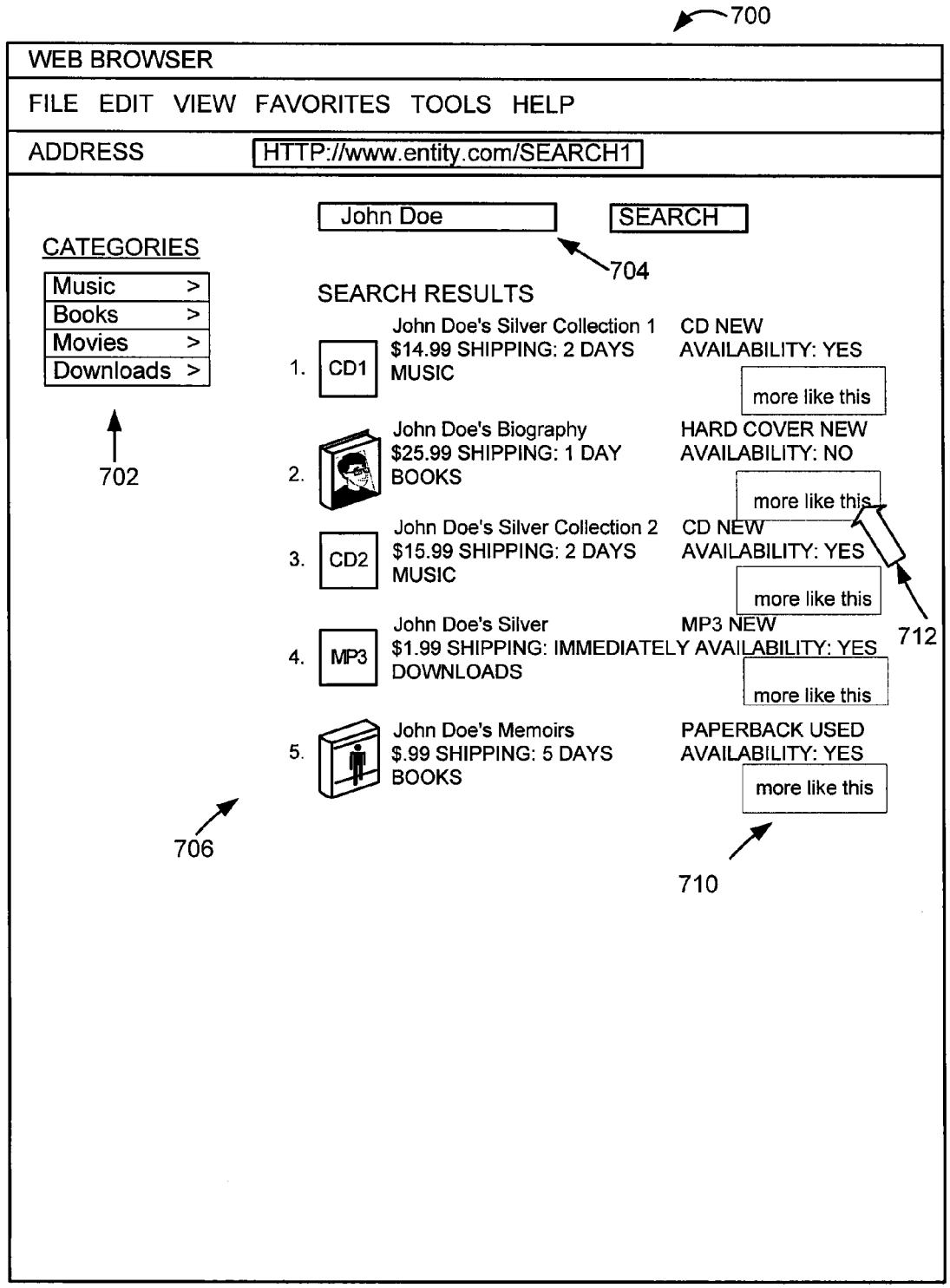
FIG. 7 illustrates an exemplary Web page showing first search results in accordance with an embodiment.

FIG. 7 illustrates an exemplary Web page 700 showing search results in accordance with an embodiment. The Web page includes a number of item categories 702 as shown on the left side of the page 700, such as "any," "music," "books," "movies," and "downloads." It will be appreciated that any number of item categories of any kind may be included in the Web page. Alternatively, the Web page may contain no categories at all; the item categories are shown in FIG. 7 for illustrative purposes only. The page 700 includes the search window 704 and the search button. As shown in the window 704, a user is conducting a search for "John Doe." The (first) search results 706 are displayed in response to the search for "John Doe." The search results, as shown in FIG. 7, may include CDs of John Doe, John Doe's biography, John Doe's MP3 available for download, John Doe's memoirs, and biography.

Additional information associated with each search result (item) may be presented, such as an indication whether the item is new or used, price, shipping information, availability information and the category to which the item belongs. The item information may contain the item description, such as, for example, item 1, a CD, is described as "John Doe's Silver Collection 1," item 2 is "John Doe's Biography," item 3 is "John Doe's Silver Collection 2," and so on. A content element 710 described above in reference to FIG. 4 is also included in the item information for each item in the search results. As illustrated, the content element includes a descriptor "more like this." As noted above in reference to FIGS. 4-6, clicking on the "more like this" element associated with a similar item a user may trigger further, more focused search. In this particular example, a user clicked on the "more like this" element next to item 2 "John Doe's Biography," as illustrated by a cursor 712 applied to the content element. As described above in reference to FIGS. 4-6, this action may trigger a retrieval of the search queries behaviorally associated with item 2, a selection of the search query with the strongest behavioral association with item 2, and subsequent search using the selected query.

Figure 8:
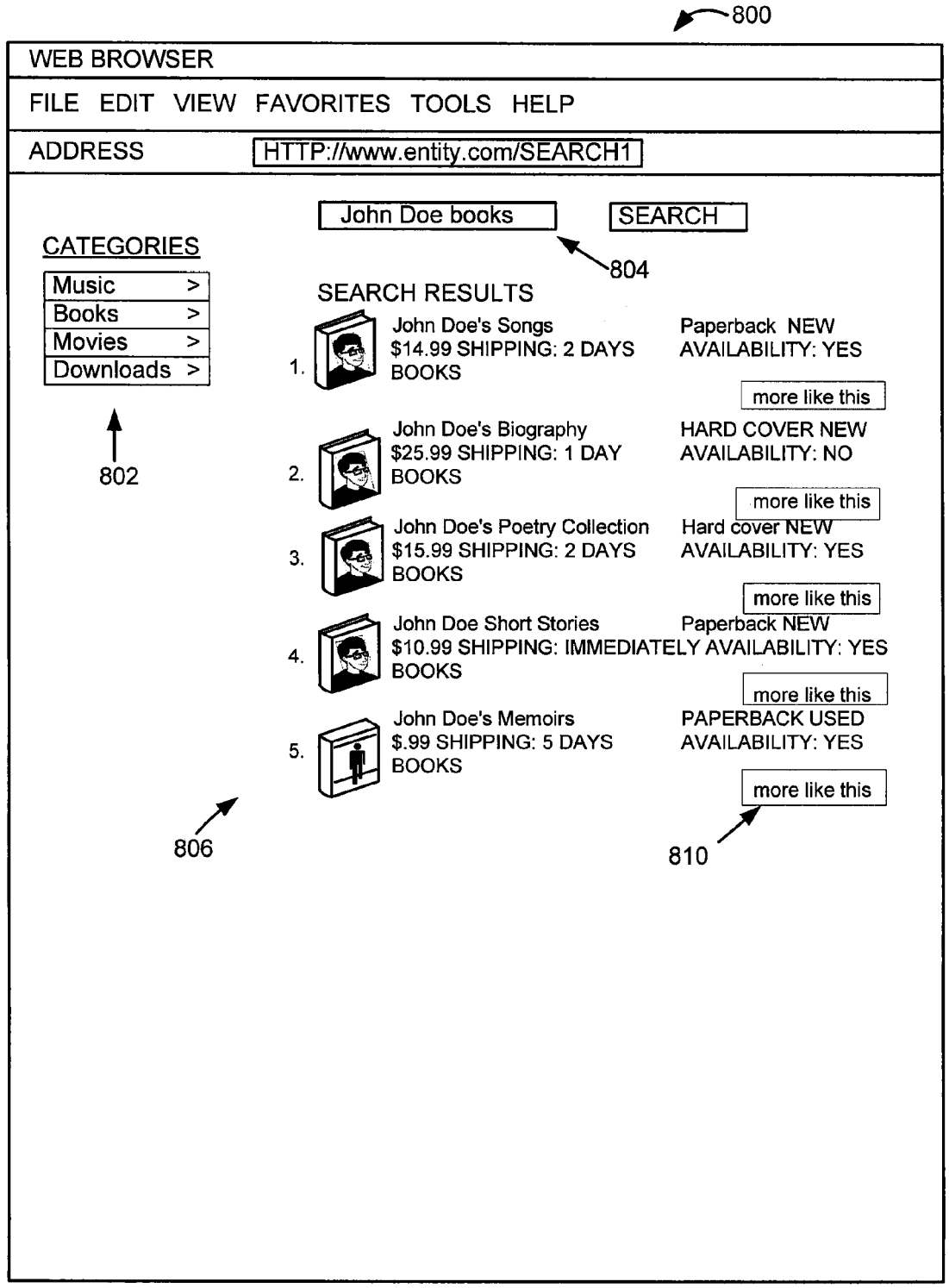
FIG. 8 illustrates an exemplary Web page showing second search results in accordance with an embodiment.

FIG. 8 illustrates an exemplary Web page showing the refined search results in accordance with an embodiment. The refined (second) search results are returned in response to a search using the selected query with the strongest behavioral association with item 2. FIG. 8 includes the Web page 800 with a Web browser which renders page 800 for display to the user. As in FIG. 7, the Web page contains search results 806 including the "more like this" content elements 810 associated with each item returned in the search results 806. The Web page further includes a number of item categories 802 as shown on the left side of the page 800, such as "any," "music," "books," "movies," and "downloads."

A search query with the strongest association with item 2 that has been identified and used in the current search may be shown in the search window 804. As illustrated in window 804, the selected search query that was used in the current search is "John Doe books." As shown in the search results 806, all items returned with the search results are indeed books or related to books written by, or about, John Doe. As noted above, a user may further narrow down his/her search by clicking on the "more like this" content element associated with the item that, in user's view, is the closest to the item desired by the user. The process will then again retrieve and select a search query with the strongest behavioral association with the newly identified similar item, the new search using the selected query will be conducted, and new search results will be returned and rendered to the user.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for optimizing search on a Web site, comprising:
    obtaining a search request including at least one search query on the Web site;
    providing a first set of items on a first page of the Web site, the first set of items associated with the at least one search query in the search request;
    identifying a set of search queries previously entered by a plurality of users to locate at least one item in the first set of items on the Web site, the set of search queries correlated with previous user behavior data associated with the at least one item in the first set of items;
    obtaining a selection requesting a second set of items associated with the at least one item;
    determining a level of behavioral association between the at least one item and individual search queries in the set of search queries, the level of behavioral association represented as a weighted value based at least in part on the previous user behavior data;
    determining at least one updated search query from the set of search queries, the at least one updated search query having the level of behavioral association with the at least one item at least meeting a behavioral association threshold value associated with the individual search queries in the set of search queries; and
    providing the second set of items corresponding to the at least one updated search query on one of the first page or a second page, the second set of items being provided without a reload of the one of the first page or the second page, the second set of items having at least one item unique from the first set of items.

2. The computer-implemented method of claim 1, wherein identifying the set of search queries previously entered by the plurality of users to locate the at least one item in the first set of items is based at least in part on data indicating a frequency of appearance of the at least one search query, viewing or scrolling behavior of the user for items associated with the set of search queries.

3. The computer-implemented method of claim 1, wherein providing the second set of items comprises providing a trusted script associated with the one of the first page or the second page.

4. The computer-implemented method of claim 1, further comprising:
    storing the set of search queries associated with the at least one item and the previous user behavior data associated with the at least one item and correlated with the at least one search query.

5. The computer-implemented method of claim 1, wherein the previous user behavior data associated with the at least one search query stored for the at least one item includes data indicating entropy of the at least one search query, a number of times the at least one item is added to an online shopping cart, and a number of purchases of the at least one item.

6. The computer-implemented method of claim 1, wherein providing the first set of items includes causing to be displayed a content element associated with the at least one item, the content element being configured, upon being selected, to cause to be displayed the set of search queries associated with the at least one item.

7. The computer-implemented method of claim 6, wherein the at least one item is placed in an online shopping cart or purchased as a result of the content element associated with the at least one item being selected.

8. A computer system comprising a processor and a memory having computer-executable instructions that, when executed by the processor, cause the processor to:
    obtain a search request including at least one search query on a Web site;
    provide a first set of items on a first page of the Web site, the first set of items associated with the at least one search query in the search request;
    identify a set of search queries previously entered by a plurality of users to locate at least one item in the first set of items, the set of search queries correlated with previous user behavior data associated with the at least one item in the first set of items;
    determine a level of behavioral association between the at least one item and individual search queries in the set of search queries, the level of behavioral association represented as a weighted value based at least in part on the previous user behavior data;
    determine at least one updated search query from the set of search queries, the at least one updated search query having the level of behavioral association with the at least one item at least meeting a behavioral association threshold value associated with the individual search queries in the set of search queries; and
    generate a second set of items corresponding to the at least one search query, the second set of items capable of being provided without a reload of one of the first page or a second page, the second set of items having at least one item unique from the first set of items.

9. The computer system of claim 8, wherein identifying the set of search queries previously entered by the plurality of users to locate the at least one item in the first set of items is based at least in part on data indicating a frequency of appearance of the at least one search query, viewing or scrolling behavior of the user for items associated with the set of search queries.

10. The computer system of claim 8, wherein the computer-executable instructions when executed further cause the processor to:
    store the set of search queries associated with the at least one item and the previous user behavior data associated with the at least one item and correlated with the at least one search query.

11. The computer system of claim 8, wherein the computer-executable instructions when executed to cause the processor to provide the first set of items, including causing to be displayed a content element associated with the at least one item, the content element being configured, upon being selected, to cause to be displayed at least a portion of the set of search queries associated with the at least one item.

12. The computer system of claim 8, wherein the computer-executable instructions when executed to cause the processor to generate the second set of items, including causing the processor to provide a trusted script associated with the one of the first page or the second page.

13. A non-transitory computer-readable storage medium having computer-executable instructions for optimizing search on a Web site stored thereon that, when executed by a computer, cause the computer to:
   obtain a search request including at least one search query;
   provide a first set of items on a first page of the Web site, at least one item of the first set of items associated with the at least one search query, the first set of items associated with a set of search queries, the set of search queries previously used by a plurality of users to locate the at least one item and being associated with previous user behavior data;
   determine a level of behavioral association between the at least one item and individual search queries in the set of search queries, the level of behavioral association represented as a weighted value based at least in part on the previous user behavior data;
   determine at least one search query from the set of search queries, the at least one search query having the level of behavioral association with the at least one item at least meeting a threshold value associated with the individual search queries in the set of search queries; and
   provide a second set of items corresponding to the at least one search query on one of the first page or a second page, the second set of items being provided without a reload of the one of the first page or the second page, the second set of items being unique from the first set of items.

14. The non-transitory computer-readable storage medium of claim 13, wherein identifying the set of search queries previously entered by the plurality of users to locate the at least one item in the first set of items is based at least in part on data indicating a frequency of appearance of the at least one search query, viewing or scrolling behavior of the user for items associated with the set of search queries.

15. The non-transitory computer-readable storage medium of claim 13 wherein the previous user behavior data associated with the at least one search query stored for the at least one item includes data indicating entropy of the at least one search query, a number of times the at least one item is added to an online shopping cart, and a number of purchases of the at least one item.

16. The non-transitory computer-readable storage medium of claim 13, wherein the computer-executable instructions when executed cause the computer to:
   store the set of search queries associated with the at least one item and the previous user behavior data associated with the at least one item and correlated with the at least one search query.

17. The non-transitory computer-readable storage medium of claim 13, wherein the computer-executable instructions when executed cause the computer to provide the second set of items includes causing the computer to provide a trusted script associated with the one of the first page or the second page.

18. The non-transitory computer-readable storage medium of claim 13, wherein the second set of items includes at least a subset of the first set of items.

* * * * *